(12) United States Patent
Moser et al.

(10) Patent No.: US 11,780,139 B2
(45) Date of Patent: Oct. 10, 2023

(54) METHOD FOR THE PRODUCTION OF PLASTIC MOULDED PARTS

(71) Applicant: KRAUSSMAFFEI TECHNOLOGIES GMBH, Munich (DE)

(72) Inventors: Stefan Moser, Hallbergmoos (DE);
Nicolina Topic, Munich (DE);
Maximilian Schadhauser, Unterhaching (DE)

(73) Assignee: KRAUSSMAFFEI TECHNOLOGIES GMBH, Munich (DE)

( * ) Notice: Subject to any disclaimer, the term of this patent is extended or adjusted under 35 U.S.C. 154(b) by 552 days.

(21) Appl. No.: 16/756,939

(22) PCT Filed: Nov. 5, 2018

(86) PCT No.: PCT/EP2018/080200
§ 371 (c)(1),
(2) Date: Apr. 17, 2020

(87) PCT Pub. No.: WO2019/096613
PCT Pub. Date: May 23, 2019

(65) Prior Publication Data
US 2021/0187807 A1    Jun. 24, 2021

(30) Foreign Application Priority Data
Nov. 16, 2017  (DE) ...................... 10 2017 126 946.0

(51) Int. Cl.
*B29C 45/18*    (2006.01)
*B29C 45/60*    (2006.01)
(Continued)

(52) U.S. Cl.
CPC .......... *B29C 45/76* (2013.01); *B29C 45/0005* (2013.01); *B29C 45/1808* (2013.01);
(Continued)

(58) Field of Classification Search
CPC ......... B29C 45/18; B29C 45/48; B29C 45/50; B29C 45/54; B29C 45/70; B29C 45/706;
(Continued)

(56) References Cited

U.S. PATENT DOCUMENTS 8,868,389 B2 * 10/2014 Chang ..................... B29C 45/26
703/9
9,669,573 B2 *  6/2017 Kariya .................... B29C 45/60
(Continued)

FOREIGN PATENT DOCUMENTS

CN         103831927 A    6/2014
CN         104870160 A    8/2015
(Continued)

OTHER PUBLICATIONS

International Preliminary Report on Patentability for PCT/EP2018/080200 dated Jan. 28, 2020.
(Continued)

*Primary Examiner* — Thu-Khanh T. Nguyen
(74) *Attorney, Agent, or Firm* — Pearne & Gordon LLP

(57) ABSTRACT

A method is described for producing fibre-reinforced plastic moulded parts, wherein endless fibre strands are fed by a fibre braking device and/or cut fibres via a gravimetric metering device, and a plastic material to be melted, by a volumetric metering device are fed to a single-screw plasticizing unit. Plastic material which is molten and is mixed with fibre material is injected into a moulding tool by an injection stroke of the plasticizing screw. According to the application, the ACTUAL mass flow of the plastic material is calculated from the ACTUAL volume flow of the plastic material and from the ACTUAL mass flow of the fibre material. The ACTUAL mass flow of the plastic material is compared to a TARGET mass flow of the plastic material,
(Continued)

and the rotation speed $n_d$ of the rotary drive of the metering element of the metering device is adapted.

13 Claims, 3 Drawing Sheets

(51) Int. Cl.
*B29C 45/76* (2006.01)
*B29C 45/00* (2006.01)

(52) U.S. Cl.
CPC ............ *B29C 45/1816* (2013.01); *B29C 2945/76354* (2013.01); *B29C 2945/76605* (2013.01); *B29C 2945/76662* (2013.01); *B29C 2945/76832* (2013.01); *B29C 2945/76936* (2013.01)

(58) Field of Classification Search
CPC ............ B29C 45/76; B29C 45/7693; B29C 45/0005; B29C 45/1808; B29C 45/60; B29C 2945/76354; B29C 2945/76605; B29C 2945/76662; B29C 2945/76832; B29C 2945/76936
See application file for complete search history.

(56) References Cited

U.S. PATENT DOCUMENTS 9,821,498 B2 * 11/2017 Okabe .................... B29C 45/60
2012/0068373 A1    3/2012 Craig et al.

FOREIGN PATENT DOCUMENTS

| DE | 10 2006 038 948 A1 | 2/2008 |
| DE | 102009056653 A1 | 6/2011 |
| EP | 2735418 A1 | 5/2014 |
| EP | 2979837 A1 | 3/2016 |
| WO | 2011066917 A2 | 6/2011 |

OTHER PUBLICATIONS

International Search Report for PCT/EP2018/080200 dated Jan. 29, 2019.
Press Release Jul. 18, 2013 for Sumitomo SHI DEMAG entitled "activeColourChange and SL-Plasticizing system-new technology components by Sumitomo (SHI) DEMAG increase performance in injection moulding".
Chinese Office action of related application 201880069305.4, dated Jun. 7, 2021.
Research on Numerical Simulation and Parameter Optimization of Plasticization Process of Injection Screw, dated Jul. 15, 2014, English machine translation of relevant pp. 15-16 and 35-36.

* cited by examiner

METHOD FOR THE PRODUCTION OF PLASTIC MOULDED PARTS

CROSS-REFERENCE TO RELATED APPLICATIONS

This is a National Stage application of PCT international application PCT/EP2018/080200 filed on Nov. 5, 2018, which claims the priority of German Patent Application No. 10 2017 126 946.0, filed Nov. 16, 2017, which are incorporated herein by reference in their entireties.

FIELD OF THE INVENTION

The invention relates to a method for the production of plastic moulded parts according to the introductory clause of claim 1.

BACKGROUND OF THE INVENTION

WO 20111066917A2 discloses an injection moulding machine for the production of fibre-reinforced plastic moulded parts, with a cylinder and with a plasticizing screw that is able to be driven rotatably and linearly in the cylinder, wherein in the cylinder a first opening is provided as filling opening for the feed of a plastic material which is to be melted, and wherein on the conveying remote side from the first opening in the cylinder, a second opening is provided as filling opening for the feed of one or more fibre bundles. The fibre bundles can be drawn off from one or more fibre spools. In the production of a fibre-reinforced plastic moulded part, the fibres are drawn in from the plasticizing screw on its rotation and are mixed into the melt. In so doing, the fibre bundles run through a fibre braking device. The plastic material which is to be processed is fed as granulate, wherein a gravimetric or a volumetric metering device can be provided.

In volumetric metering, the discharge of the granulate takes place exclusively in a volume-related manner. The metering elements of a volumetrically operating metering device are to be calibrated to the respective material, i.e. it is to be determined how much material the metering element doses in a defined period of time. As metering element for example a metering screw can be provided. A problem in volumetric metering devices is that fluctuations in the bulk density can not be compensated automatically. Such fluctuations in the bulk density of the granulate lead, however, to a change in the ratio of fibre material and of plastic material in the injection-moulded, fibre-reinforced plastic moulded parts. In the production of fibre-reinforced plastic moulded parts it is desirable, however, that as constant a ratio as possible of fibre material and of plastic material is maintained during the production of the fibre-reinforced plastic moulded parts.

In gravimetric or weight-regulated metering, one or more load cells integrated in a suitable manner into the metering device measure i.e. weigh the granulate which is to be metered. By means of the weight as measured value, a regulating of the metering can take place through target/actual comparison. Metering devices operating in a gravimetric manner can therefore automatically compensate fluctuations in the bulk density. A disadvantage in gravimetrically operating metering devices is that they are distinctly more expensive than volumetric metering devices, in particular owing to the use of highly sensitive load cells and a relatively complex control unit for the operation of the gravimetric metering device.

BRIEF SUMMARY OF THE INVENTION

Proceeding from the prior art named in the introduction, the invention is based on the problem of indicating a method by which plastic moulded parts can be produced on an injection moulding machine which is equipped with a single-screw plasticizing unit, wherein a volumetric metering device can be used for the plastic material and nevertheless as constant an ACTUAL mass flow of plastic material as possible can be maintained.

The solution to this problem takes place through a method with the features of claim 1.

A further problem forming the basis of the invention can be seen in indicating a method by which fibre-reinforced plastic moulded parts can be produced on an injection moulding machine equipped with a single-screw plasticizing unit, wherein a volumetric metering device can be used for the plastic material, and nevertheless a constant ratio of fibre material and of plastic material can be maintained in the finished fibre-reinforced plastic moulded parts during the production of these parts.

The solution to this further problem takes place through a method with the features of claim 2.

Advantageous embodiments and further developments are to be found in the further claims.

Through the fact that the ACTUAL mass flow of the plastic material is calculated, wherein the ACTUAL mass flow is calculated from the return speed $v_{screw,back,n}$ of the plasticizing screw during a melt metering process, the diameter of the plasticizing screw and the melt density, that the ACTUAL mass flow of the plastic material is compared with a TARGET mass flow of the plastic material, and that with a predeterminable difference value between ACTUAL mass flow of the plastic material and the TARGET mass flow of the plastic material, the rotation speed of the rotary drive of the metering element is changed in such a way that the difference value is reduced, wherein the difference value is preferably to reach zero, a readjustment of the ACTUAL mass flow of plastic material can take place and therefore fluctuations in the bulk density can be reacted to. In the case of fluctuations in the bulk density of the plastic material therefore a readjustment of the metering capacity, which corresponds to the ACTUAL mass flow of plastic material, can be carried out and the ACTUAL mass flow can be kept constant. A volumetric metering device is therefore used, but for the method according to the invention the mass flow of plastic material, which is fed into the cylinder from the metering device, is used and not the volume flow. A readjustment of the metering capacity of the volumetric metering device therefore takes place as a result of a calculation of the ACTUAL mass flow of the plastic material fed into the cylinder from this metering device, and of a comparison of this ACTUAL mass flow with a predeterminable TARGET mass flow.

"Melt metering process" is to be understood here to mean the process in which the plasticizing screw mixes, through a rotary movement, plastic granulate and/or further components, which are added through one or more openings in the plasticizing cylinder, converts the mixture into a molten state and conveys the mixture at the conveying remote end of the plasticizing screw into the so-called screw prechamber. Through the pressure occurring in the screw prechamber, the plasticizing screw is displaced during the melt metering process along its axis in the direction opposed to the conveying direction.

The melt density $\rho_s$ is a value which depends significantly on the type of material, the melt temperature and the pressure with which the melt is acted upon. To characterize types of material, compression tests are therefore carried out by material manufacturers and so-called pvT curves are recorded. In these curves, the specific melt volume $v_s$, which represents the reciprocal of the density $\rho_s$ ($v=1/\varphi$ is entered as a function of the present temperature T and the pressure p. In the known context, $v_s(p,T)$, the melt density $\rho_s$ can be determined as a function of the environmental conditions, as follows:

$$\rho_s(p,T)=1/[v_s(p,T)]$$

$\rho_s(p,T)$: melt density p: pressure

T: temperature $v_s$: specific melt volume

Thereby, it becomes possible that the desired ACTUAL mass flow is maintained even in the case of plastic material which is critical with regard to dwell time. In particular, in a preferred embodiment the screw can be operated in an underfed manner. An underfed state designates a form of operation in which less material is delivered to the screw than this would draw in from a full hopper. A preferred field of application is the production of plastic moulded parts for optical purposes. Plastic moulded parts for optical purposes, for example lenses, are mostly thick-walled and require a sufficiently long cooling in the moulding tool. So that during the cooling phase, the plastic present in a molten manner in the plasticizing unit does not undergo any damage through polymer chain degradation or oxidative degeneration, the reduction of the average dwell time of the plastic melt in the plasticizing unit is aimed for. The plastic volume present absolutely in the plasticizing unit is, inter alia, definitive for the average dwell time. As this is reduced through an underfed operating state compared to the material feed from a full hopper, the mean dwell time can be reduced through an underfed operation, and therefore the damage to the plastic melt can be counteracted.

A further field of application relates to the production of fibre-reinforced plastic moulded parts. Here, a fibre material can be added into the cylinder and a fibre-reinforced plastic moulded part can be produced, wherein endless fibre strands can be fed to the plasticizing unit via a fibre braking device, and/or cut fibres can be fed via a gravimetric metering device. Preferably, through a first opening in the cylinder the plastic material which is to be melted can be fed as granulate into the cylinder. On the conveying remote side from the first opening, the endless fibre strands can be fed via a second opening, and/or the cut fibres can be fed via a third opening, into the cylinder and can be drawn in by the plasticizing screw through rotation. Plastic material which is molten and is mixed with fibre material can be injected into a moulding tool through an injection stroke of the plasticizing screw, and a fibre-reinforced plastic moulded part can be produced. Thereby it becomes possible that also with a use of a volumetric metering device for the plastic material as constant a ratio of fibre material and of plastic material can be maintained during the production of the fibre-reinforced plastic moulded parts.

According to a further embodiment, the ACTUAL volume flow of the plastic material can be determined from the volume of plastic material which is molten and mixed with fibre material, conveyed into the screw pre-chamber during a melt metering process.

The ACTUAL mass flow dm/dt of fibre material with known fibre feed speed $v_f$ and known fibre strand thread fineness $n_{tex}$ and the fibre strand number $n_f$ can be calculated with the following formula:

$$dm_f/dt = v_f * n_f * n_{tex}$$

$dm_f/dt$: actual mass flow of fibre material $v_f$: fibre feed speed $n_f$: number of fed fibre strands $n_{tex}$: thread fineness of a fed fibre strand According to a further development of the method according to the invention, a change to the metering rotation speed $n_d$ can be carried out from injection moulding cycle to injection moulding cycle. However, it is also possible to use a PI controller for a change to the metering rotation speed $n_d$.

According to a further embodiment, the ACTUAL mass flow can be averaged over several injection moulding cycles. The mean value which is thus formed can then be used for a change of the rotation speed $n_d$ of the rotary drive of the metering drive.

According to a particularly preferred further development of the method according to the invention, the ACTUAL mass flow of plastic material, $dm_k/dt$ can be calculated as follows:

$$dm_k/dt = D_s * \pi * v_{screw,back,n} * \rho_s(p,T) - dm_f/dt$$

$dm_k/dt$: actual mass flow of plastic material $D_s$: screw nominal diameter $v_{screw,back,n}$: screw return speed during the plasticizing $\rho_s(p,T)$: melt density p: pressure T: temperature $dm_f/dt$: actual mass flow of fibre material If for an injection moulding cycle n the ACTUAL mass flow of the plastic material is calculated, an adaptation of the ACTUAL mass flow to the TARGET mass flow can be carried out for one of the subsequent injection moulding cycles, in particular for the immediately following injection moulding cycle n+1, by changing the rotation speed of the rotary drive of the metering element.

Depending on the granulate which is to be processed, a metering screw or a metering disc can be used as metering element.

Preferably, the endless fibre strands can be drawn off from a fibre gate equipped with fibre spools.

The fibre braking device can preferably be arranged between the fibre gate which is equipped with the fibre spools, and the plasticizing unit, and can impart an adjustable fibre conveying speed to the fibre strands which are fed to the plasticizing unit. This speed can not be exceeded, even when the screw which is present in the plasticizing unit rotates with a circumferential speed which is greater than the set fibre conveying speed.

The cut fibres can be delivered as chopped glass fibres or as a component of a further plastic granulate. Furthermore, the possibility exists to cut and then deliver endless fibre strands.

Furthermore, provision can be made to work both endless fibres and also chopped glass fibres and/or fibre-reinforced granulates into the melt. This can be expedient in particular in the processing of recycled materials.

BRIEF DESCRIPTION OF THE DRAWINGS

The invention is to be explained further below with the aid of example embodiments and with reference to the figures. There are shown.

DESCRIPTION OF EXAMPLE EMBODIMENTS

Figure 1:
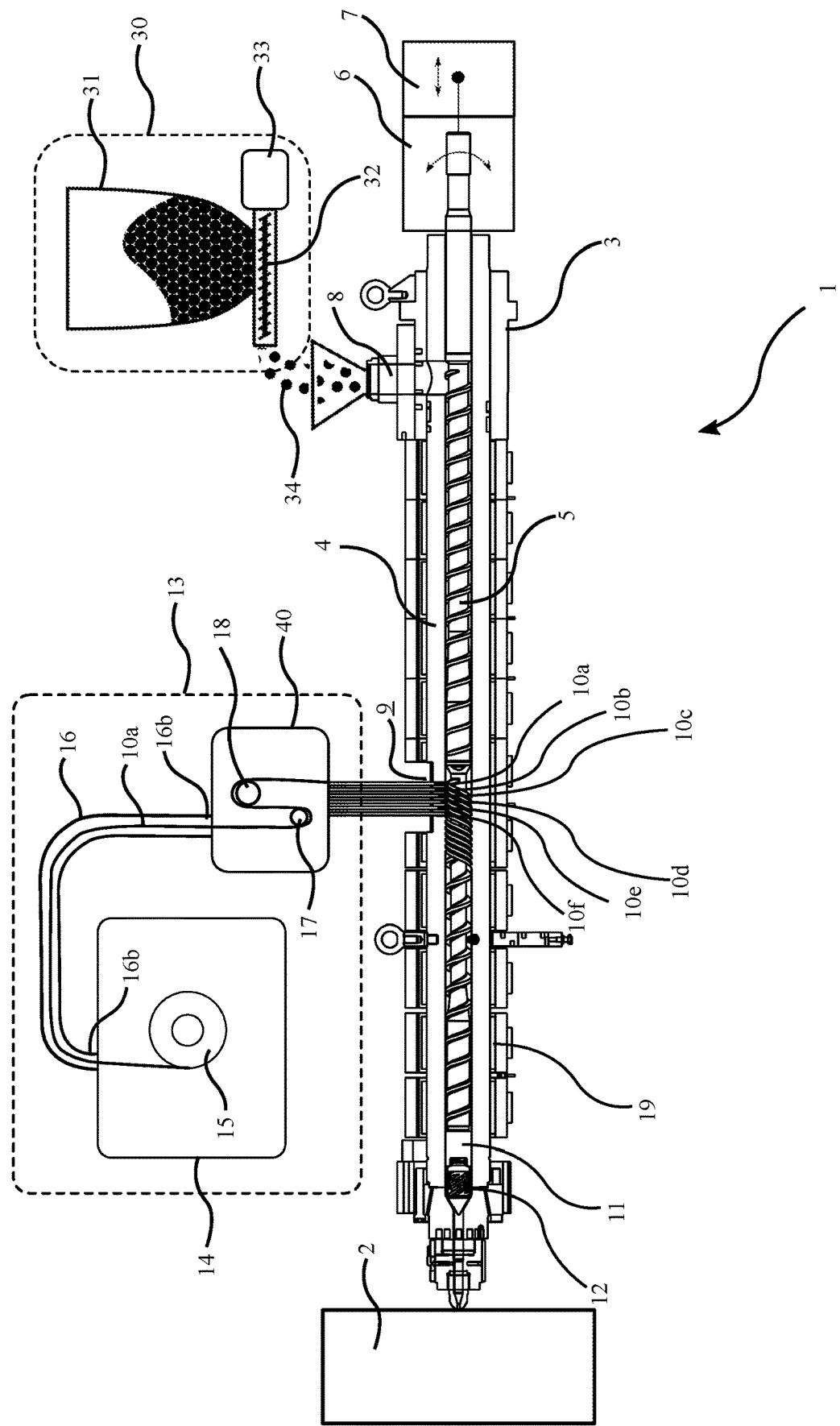
FIG. 1 First embodiment of an injection moulding machine with a single-screw plasticizing unit according to the invention.

FIG. 1 shows the use of a single-screw plasticizing unit according to the invention as component of an injection moulding machine. The injection moulding machine 1 illustrated in FIG. 1 comprises substantially a clamping unit 2, indicated only diagrammatically here, and a single-screw plasticizing unit 3 according to the invention. The clamping unit 2 and the single-screw plasticizing unit 3 are arranged in a manner known per se on a machine bed, which is not illustrated here. The single-screw plasticizing unit 3 comprises a cylinder 4 with a plasticizing screw 5. On the outer side of the cylinder 4, several heating elements 19 are arranged. The rear end of the screw 5 is operatively connected with a rotary drive 6 and with a linear drive 7. By means of the linear drive 7, the screw 5 can be moved axially in the cylinder 4, i.e. the screw 5 is configured as a reciprocating screw and is provided for the injecting of plastic melt, mixed with fibres, into an injection moulding tool, not illustrated here, situated in the clamping unit 2. In the rear end region of the screw threads, a first opening is provided as filling opening 8 for the feeding of a plastic material which is to be melted.

The plastic material is present as granulate and is delivered to the filling opening 8 by a volumetric metering device 30. The metering device 30 comprises a storage container 31 to receive granulate, a rotatable metering element 32 and a rotary drive 33 for actuating the metering element. The fact that plastic material is used in the form of granulate is to be indicated by the dots in the storage container 31. The reference number 34 is given for one of the dots.

On the conveying remote side from the first opening 8, a second opening is provided as filling opening 9 in the cylinder 4 for the feeding of a fibre material. The fibre material is preferably introduced via a fibre braking device 40 into the opening 9 in the form of fibre bundles 10a-10f, separated spatially from one another. A fibre bundle can also be designated as a roving. At the front end, the screw 5 has a backflow barrier 11, and has at the conveying remote side from the backflow barrier 11 a mixing part 12 connected in a rotationally fixed manner with the screw 5 and corotating with the latter. FIG. 1 shows a situation as is present at the end of an injection process. The screw 5 is situated in its front end position. The conically tapering head of the mixing part 12 lies seated in a fitting conical recess in the cylinder 4.

The feeding of the fibre material and the mode of action of the fibre braking device 40 is to be described in further detail with the aid of the fibre bundle 10a. For a better overview, the fibre feed device, designated as a whole by reference number 13 and only illustrated diagrammatically, is illustrated on a greatly enlarged scale in relation to the plasticizing unit 3. The fibre feed device 13 comprises a fibre storage container 14 with one or more fibre spools 15, from which respectively a fibre bundle can be drawn off. In the present example embodiment according to FIG. 1, a total of six (6) fibre bundles 10a to 10f are to be fed to the screw 5, so that in the fibre storage container 14 consequently six (6) fibre spools are provided. Only one single fibre spool 15 for the fibre bundle 10a is illustrated here. The fibre bundle 10a is guided through a tube 16, configured as an antistatic tube, which has an inlet opening 16a and an outlet opening 16b. The inlet opening 16a is arranged at a suitable location at or in the fibre storage container 14. The fibre braking device 40 is arranged downstream of the outlet end 16b.

The fibre braking device designated as a whole by reference number 40 permits the determining of the ACTUAL mass flow of fibre material. The fibre braking device 40 comprises substantially at least one deflector roller 17 and at least one brake roller 18, driven in a braking manner, wherein endless fibres are guided in a slip-free manner via both rollers. Through the slip-free guidance, the fibre feed speed of can be determined from the rotation speed of the brake roller $n_{bw}$.

When the fibre bundle 10s is caught by the screw 5 so that through the rotation of the screw 5 the fibre bundle 10a is drawn into the melt and is thereby withdrawn from the fibre spool 15, the fibre feed device 13 acts as a brake, wherein the braking effect and thereby the braking force is distributed to the various components of the fibre feed device 13 as described below.

A first braking force is provided on the fibre spool 15. The fibre spool 15 is rotatably mounted and is braked by the friction of the mounting (not illustrated) in its rotation so that the fibre bundle 10a is prestressed with approximately 10 Newton.

A second braking force is achieved by means of the tube 16, wherein the tube 16 is installed such that it has one or more circular segments. This leads to a second braking effect with a second braking force through the effect of rope friction in accordance with Euler-Eytelwein. This second braking force generates approximately 70 Newton of the fibre drawing-in force, so that the fibre drawing-in force at the end of the tube 16 is in total approximately 80% of the fibre drawing-in force.

A third braking force is generated by means of the brake roller 18. The fibre bundle 10a is guided around a freely rotatably mounted deflector roller 17 and subsequently around a speed-regulated brake roller 18 and from there to the screw 5. The drive of the brake roller 18 takes place preferably by means of a gear motor. By means of the brake roller 18, the final 20% of the pre-stressing force is applied. The arrangement of the deflector roller 17 and brake roller 18 is such that both the deflector roller 17 and also the brake roller 18 will rotate respectively with 180°.

The ACTUAL mass flow of the fed fibre material is known from the conditions of the fibre braking device 40 and can be determined as follows:

$$dm_f/dt = v_f * n_f * n_{tex}$$

$dm_f/dt$: actual mass flow of fibre material
$v_f$: fibre feed speed
$n_f$: number of fed fibre strands
$n_{tex}$: thread fineness of a fed fibre strand With reference to the volumetric metering device 30, firstly a calibration to the material which is used is to be carried out. This calibration provides an initial metering capacity $P_{D,0}$, which corresponds to the granulate throughput in grams per rotation of the metering element 32.

In the following production operation, the ACTUAL mass flow of plastic material of an injection moulding cycle n can be determined as follows:

$$dm_k/dt = [D_s * \pi * v_{screw,back,n} * \rho_s(p,T)] - dm_f/dt$$

$dm_k/dt$: actual mass flow of plastic material
$D_s$: screw nominal diameter
$v_{screw,back,n}$: screw return speed during the plasticizing
$\rho_s(p,T)$: melt density
pressure
T: temperature
$dm_f/dt$: actual mass flow of fibre material A comparison of TARGET mass flow and ACTUAL mass flow or respectively of TARGET metering capacity and ACTUAL metering capacity provides a specification for the adaptation of the rotation speed $n_d$ of the rotary drive for the metering element, in particular a metering screw. This adaptation can take place for example from cycle to cycle. However, a PI controller can also be used.

Furthermore, it is possible to average the ACTUAL mass flow of plastic material or respectively the ACTUAL metering capacity over several cycles and to carry out an adaptation of the rotation speed $n_d$ on the basis of this mean value.

By means of the method according to the invention, it is possible to use volumetric metering devices and to thereby save costs, because these are distinctly more reasonably priced than gravimetric metering devices. Nevertheless, fluctuations in the bulk density can be detected and compensated. Consequently, as constant a ratio as possible of fibre material and of plastic material in the finished fibre-reinforced plastic moulded parts can be maintained during the production of these parts.

Figure 2:
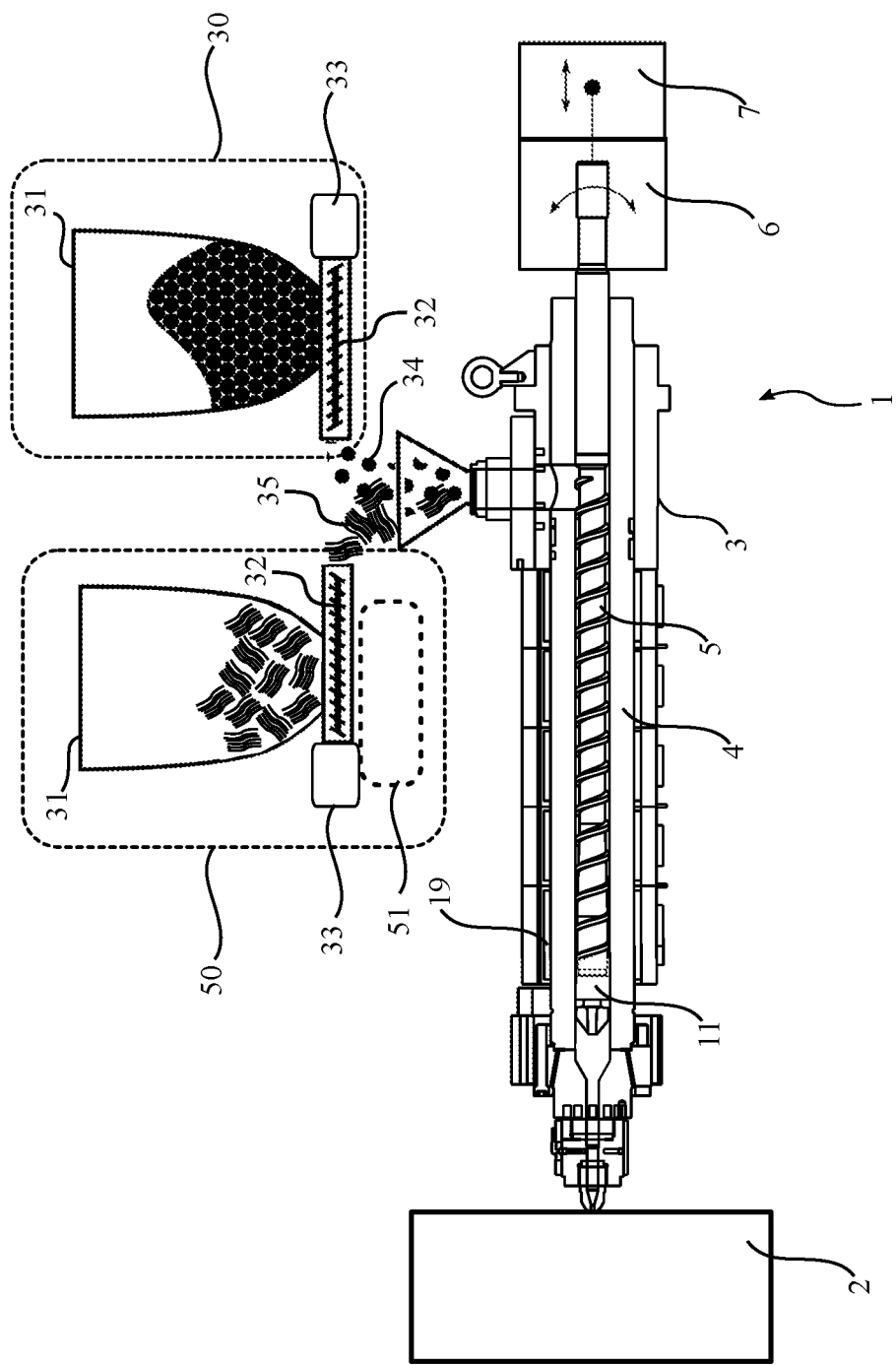
FIG. 2 Second embodiment of an injection moulding machine with a single-screw plasticizing unit according to the invention.

FIG. 2 shows a second embodiment of an injection moulding machine with a single-screw plasticizing unit according to the invention. In contrast to FIG. 1, here the fibre material is not fed in the form of endless fibres, but rather as cut fibres. Unlike in FIG. 1, the fibre material and the plastic material are fed into the cylinder through the same bore. The cut fibres 35 are fed into the cylinder 4 via a gravimetric metering device 50. Owing to the load cell 51, the ACTUAL mass flow of cut fibres 35 is known. Consequently, here also as constant a ratio as possible of fibre material and of plastic material in the finished fibre-reinforced plastic moulded parts can be maintained during the production of these parts. Chopped glass fibres are preferably used as cut fibres.

Figure 3:
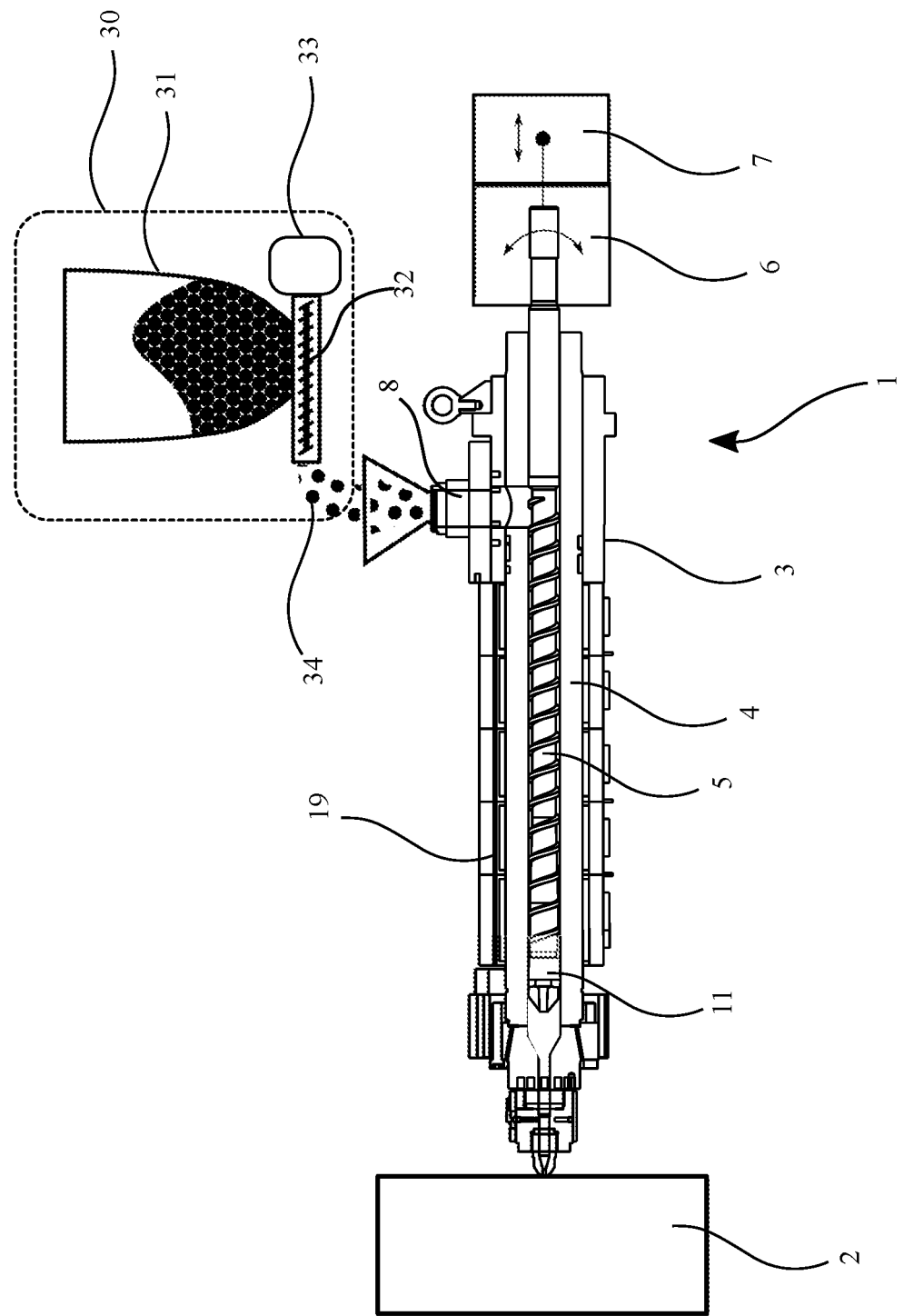
FIG. 3 Third embodiment of an injection moulding machine with a single-screw plasticizing unit according to the invention

FIG. 3 shows a single-screw plasticizing unit according to the invention, which is operated without the addition of fibre material with only one plastic component. In this case, only the volumetric metering device 30 is used. By means of the method according to the invention, as constant an ACTUAL mass flow of plastic material as possible can be maintained. Thereby, it becomes possible that also in the case of plastic material which is critical with regard to dwell time, the desired ACTUAL mass flow is maintained. In particular, in a preferred embodiment the screw can be operated in an underfed manner. A preferred field of application is the production of plastic moulded parts for optical purposes.

Further variants of the invention are not illustrated. For example, it is also possible to work both endless fibres and also chopped glass fibres into the melt.

List of reference numbers

| | |
|---|---|
| 1 | injection moulding machine |
| 2 | clamping unit |
| 3 | single-screw plasticizing unit |
| 4 | cylinder |
| 5 | plasticizing screw |
| 6 | rotary drive |
| 7 | linear drive |
| 8 | first filling opening |
| 9 | second filling opening |
| 10a-10f | individual fibre strands or respectively rovings |
| 11 | backflow barrier |
| 12 | mixing part |
| 13 | fibre feed device |
| 14 | fibre storage container/fibre gate |
| 15 | fibre spool |
| 15a-15f | fibre spools |
| 16 | antistatic tube |
| 16a | inlet opening |
| 16b | outlet opening |
| 17 | deflector roller |
| 18 | brake roller |
| 19 | heating element |
| 30 | volumetric metering device |
| 31 | storage container |
| 32 | metering screw |
| 33 | rotary drive |
| 34 | granulate |
| 35 | cut glass fibres |
| 40 | fibre braking device |
| 50 | gravimetric metering device |
| 51 | load cell |

What is claimed is:

1. A method for the production of plastic moulded parts, comprising:
    driving a plasticizing screw rotatably and linearly within a cylinder of a plasticizing unit,
    feeding a plastic material to be melted into the cylinder via a first opening in the cylinder a volumetric metering device,
    storing the plastic material in storage container of the volumetric metering device,
    actuating a rotatable metering element of the volumetric metering device by a rotary drive,
    separately adding a fibre material into the cylinder by feeding endless fibre strands via a fibre braking device and/or feeding cut fibres via a gravimetric metering device to the plasticizing unit,
    mixing the plastic material with the fibre material to create a mixture, and injecting the mixture into a moulding tool by an injection stroke of the plasticizing screw,
    the method further comprising the steps of:
        determining a linear return speed $v_{screw,back,n}$ of the plasticizing screw during a melt metering process, a nominal diameter of the plasticizing screw, and a melt density,
        calculating an ACTUAL mass flow of the plastic material from the linear return speed $v_{screw,back,n}$ of the plasticizing screw during the melt metering process, the nominal diameter of the plasticizing screw, and the melt density,
        comparing the ACTUAL mass flow of the plastic material with a TARGET mass flow of the plastic material,
        determining a difference value between the ACTUAL mass flow of the plastic material and the TARGET mass flow of the plastic material, and
        changing a rotation speed $n_d$ of the rotary drive of the rotatable metering element in such a way that the difference value is reduced.

2. The method according to claim 1,
wherein
via the first opening in the cylinder the plastic material which is to be melted is fed as granulate into the cylinder, that on a conveying remote side from the first opening the endless fibre strands are fed via a second opening and/or the cut fibres are fed via the first opening or via a third opening into the cylinder and are drawn in by the plasticizing screw through rotation.

3. The method according to claim 1,
wherein
an ACTUAL mass flow of fibre material on the feeding of endless fibre strands or on the feeding of cut fibres is calculated as follows:

$$dm_f/dt = v_f * n_f * n_{tex}$$

wherein
$dm_f/dt$: actual mass flow of fibre material
$v_f$: fibre feed speed
$n_f$: number of fed fibre strands
$n_{tex}$: thread fineness of a fed fibre strand.

4. The method according to claim 1,
wherein
a change to the rotation speed $n_d$ of the rotary drive of the metering element is carried out from injection moulding cycle to injection moulding cycle, or that a PI controller is used for a change to the rotation speed.

5. The method according to claim 1,
wherein
the ACTUAL mass flow of plastic material is averaged over several injection moulding cycles, and the thus formed mean value is used for a change to the rotation speed $n_d$ of the rotary drive of the metering element.

6. The method according to claim 1,
wherein
the ACTUAL mass flow of plastic material is calculated as follows:

$$dm_k/dt = [D_s^2/4] * \pi * v_{screw,back,n} * \rho_s(p,T) - dm_f/dt$$

wherein
$dm_k/dt$: actual mass flow of plastic material
$D_s$: screw nominal diameter
$v_{screw,back,n}$: screw return speed during the plasticizing
$\rho_s(p,T)$: melt density
p: pressure
T: temperature
$dm_f/dt$: actual mass flow of fibre material.

7. The method according to claim 1,
wherein
for an injection moulding cycle the ACTUAL mass flow of the plastic material is calculated and that for one of the subsequent injection moulding cycles, for the injection moulding cycle immediately following therefrom, an adaptation of the ACTUAL mass flow to the TARGET mass flow is carried out by changing the rotation speed $n_d$ of the rotary drive of the metering element.

8. The method according to claim 1,
wherein
a metering screw or a metering disc is used as metering element.

9. The method according to claim 1,
wherein
endless fibre strands are withdrawn from a fibre gate equipped with fibre spools.

10. The method according to claim 1, wherein the fibre braking device imparts an adjustable, slip-free speed to the endless fibre strands.

11. The method according to claim 1,
wherein
the cut fibres are fed as chopped glass fibres or as a component of a plastic granulate.

12. The method according to claim 1, wherein the plastic material which is to be melted comprises at least one of granulate, powder, bars and/or liquid silicone.

13. The method according to claim 1, wherein the difference value is reduced to zero.

* * * * *